(12) United States Patent
Loveland

(10) Patent No.: US 8,864,150 B2
(45) Date of Patent: Oct. 21, 2014

(54) FOOT PROPELLED VEHICLE

(75) Inventor: Andrew John Loveland, Henley on Thames (GB)

(73) Assignee: Early Rider Ltd., Hampshire (GB)

( * ) Notice: Subject to any disclaimer, the term of this patent is extended or adjusted under 35 U.S.C. 154(b) by 263 days.

(21) Appl. No.: 13/269,264

(22) Filed: Oct. 7, 2011

(65) Prior Publication Data

US 2012/0043734 A1 Feb. 23, 2012

Related U.S. Application Data

(63) Continuation-in-part of application No. PCT/GB2010/000662, filed on Apr. 1, 2010.

(30) Foreign Application Priority Data

Apr. 8, 2009 (GB) .................................. 0906170.6
Feb. 2, 2011 (GB) .................................. 1101781.1

(51) Int. Cl.
*B62M 1/00* (2010.01)
*A61H 3/04* (2006.01)
*B62K 3/10* (2006.01)
*B62K 9/00* (2006.01)

(52) U.S. Cl.
CPC .... B62K 9/00 (2013.01); B62K 3/10 (2013.01)
USPC .............. 280/87.021; 280/87.041; 280/87.01; 280/200

(58) Field of Classification Search
CPC ........ A63C 17/01; B62K 3/002; B62D 55/02; B62D 63/062; B60B 19/00; B60B 27/0005; B60N 2/4221; B62B 1/00; B62B 3/007; B62B 11/00; A61H 3/04; A61H 2003/046; A61H 3/00; B62K 9/02; A47D 13/043; B62C 1/08; F16C 19/187; A63H 33/00; A63H 33/02; A63H 17/38; A63H 17/262; A63H 17/00
USPC .......... 280/87.041, 28.5, 29, 200, 263, 87.01, 280/87.021, 87.03, 62, 63, 105; 446/431, 446/450, 451, 465; 482/66, 68

See application file for complete search history.

(56) References Cited

U.S. PATENT DOCUMENTS 3,152,813 A * 10/1964 Brown .......................... 280/220
3,379,454 A * 4/1968 Woodman ................ 280/87.042

(Continued)

FOREIGN PATENT DOCUMENTS

| BE | 893233 | 9/1982 |
| GB | 2190635 | 11/1987 |
| WO | 8203335 | 10/1982 |

*Primary Examiner* — J. Allen Shriver, II
*Assistant Examiner* — James M Dolak
(74) *Attorney, Agent, or Firm* — McDonnell Boehnen Hulbert & Berghoff LLP

(57) ABSTRACT

A foot propelled vehicle comprises a front housing in which a first rotatable ground engaging sphere is mounted by bearings for rotation about a transverse axis and a rear housing in which a second rotatable ground engaging sphere is mounted by bearings for rotation about three orthogonal axes. The front housing is longitudinally spaced from and connected rigidly to the rear housing. A seat is situated between the first and second housings and positioned so that a rider's feet can contact the ground to propel the vehicle. A handle is mounted on the front housing for the user to hold whilst riding and steering the vehicle. Lateral stabilizers may be provided. In some embodiments both spheres may be mounted for rotation about three orthogonal axes.

24 Claims, 3 Drawing Sheets

(56) References Cited

U.S. PATENT DOCUMENTS

| | | |
|---|---|---|
| 3,401,421 A | 9/1968 | Aninger |
| 3,794,351 A * | 2/1974 | Cudmore .................. 280/204 |
| 4,150,838 A * | 4/1979 | Lappage ............... 280/87.042 |
| 4,225,147 A * | 9/1980 | Lowery .................. 280/87.01 |
| 5,409,265 A | 4/1995 | Douglass |
| 5,826,674 A * | 10/1998 | Taylor ...................... 180/219 |
| 6,568,695 B2 * | 5/2003 | Dornan ................. 280/87.042 |
| 6,802,381 B1 * | 10/2004 | Koors et al. ................. 180/7.1 |
| 8,028,775 B2 * | 10/2011 | Orenbuch ................... 180/6.2 |
| 8,226,095 B2 * | 7/2012 | Reyes, Jr. ............. 280/87.042 |
| 8,226,096 B2 * | 7/2012 | Reyes, Jr. ............. 280/87.042 |
| 8,459,667 B2 * | 6/2013 | Ungar et al. .......... 280/87.041 |
| 2002/0070514 A1 * | 6/2002 | Costa et al. ........... 280/11.226 |
| 2008/0283311 A1 * | 11/2008 | Li ............................. 180/65.1 |

* cited by examiner

FOOT PROPELLED VEHICLE

BACKGROUND

This invention relates to a foot propelled vehicle, and is particularly but not exclusively concerned with a vehicle which a child can sit on and propel by engaging their feet along the floor.

There are known starter bicycles which a child can sit on before they have acquired the skills necessary to ride a pedal powered bicycle. Such a starter bicycle may have stabilising wheels to the left and right of the frame which are intended to ensure that the bicycle will not topple over, even if the child lifts its feet from the ground. The stabilisers can be removed as the child becomes more experienced, but there is than an increased of injury to the child.

One object of the present invention is to provide a foot propelled vehicle which has improved stability.

SUMMARY

Viewed from one aspect, the present invention provides a vehicle comprising: a front housing in which a front rotatable ground engaging sphere is mounted by bearings; a rear housing in which a rear rotatable ground engaging sphere is mounted by bearings; a seat portion for a user; and a handle mounted on the front housing for the user to hold whilst riding the vehicle, wherein at least one of said front and rear spheres is mounted by bearings so that the sphere can rotate about a plurality of axes.

In a preferred embodiment, the vehicle is foot propelled, and a user can sit on the seat portion with the users feet engaging the ground to propel the vehicle. The seat portion may be provided on the rear housing or between the front and rear housings In a preferred embodiment of the present invention, the arrangement is such that said at least one sphere is mounted by said bearings for rotation about three orthogonal axes.

In a preferred embodiment of the present invention, the arrangement is such that whilst said one sphere is mounted by bearings for rotation about three orthogonal axes, the other sphere is mounted for rotation about a single axis so as to turn as a wheel. If this sphere is a non-steering sphere, that may be the only axis of rotation.

One embodiment of the invention provides a vehicle comprising: a front housing in which a front rotatable ground engaging sphere is mounted by means of bearings such that the front sphere can rotate about a plurality of axes; a rear housing in which a rear rotatable ground engaging sphere is mounted by mans of bearings such that the sphere can rotate about a plurality of axes; a seat portion for a user; and a handle mounted on the front housing for the user to hold whilst riding the vehicle.

A vehicle in accordance with the invention can be manoeuvred in any direction by translation or rotation in the ground-plane. This makes the vehicle easy and fun to ride, although it requires balance from the operator to use effectively. In preferred embodiments, the spherical "wheels" mean that the vehicle will not fall awkwardly either on top of or underneath a rider. Essentially, the outer casing of the spherical components rotates until stopped by the ground, and so nothing actually falls down to present a hazard for the rider. This is an obvious benefit when considering the age and developmental stage of the target rider for the preferred embodiment.

Another embodiment of the invention provides a vehicle comprising: a front housing in which a front rotatable ground engaging sphere is mounted by means of bearings such that the front sphere can rotate about one or more axes; a rear housing in which a rear rotatable ground engaging sphere is mounted by means of bearings such that the sphere can rotate about one or more axes; a seat portion for a user; and a handle mounted on the front housing for the user to hold whilst riding the vehicle; wherein one of the spheres is mounted for rotation about three orthogonal axes and the other sphere is mounted for rotation about no more than two axes.

In one arrangement, said other sphere is mounted for rotation about a single transverse axis so as to serve as a wheel for the vehicle. In another arrangement said other sphere is mounted in its housing for rotation about a single axis relative to the housing so as to serve as a wheel for the vehicle, but the housing is mounted for rotation about a second axis for steering the vehicle. The said other sphere will therefore preferably be the front sphere. Thus, there is provided the front housing in which the front rotatable ground engaging sphere is mounted by means of bearings such that the front sphere can rotate about two axes only, one so that the front sphere can serve as a wheel and one so that the front sphere can pivot so as to steer the vehicle.

In one arrangement the rear sphere is mounted for rotation about three orthogonal axes and the front sphere is mounted for rotation about a single transverse axis. Steering of the vehicle is effected by manipulation so that the rear sphere moves laterally and the vehicle swings around the front sphere. In another arrangement the front sphere is mounted for rotation about three orthogonal axes and the rear sphere is mounted for rotation about a single axis. Steering of the vehicle is effected by manipulation so that lateral movement of the front sphere steers the vehicle and the rear sphere follows.

In some embodiments the vehicle may be steered through movement of the handle to rotate the front sphere in the manner of steering a cycle using a handlebar. In other embodiments the vehicle is steered by using the feet which propel the vehicle and/or by shifting weight. In such an embodiment the fact that one sphere can rotate about three orthogonal axes is sufficient to enable a user to steer the vehicle by using the feet and/or by shifting weight so that the vehicle points in the correct direction, even though the other sphere may be mounted for rotation only about a single, transverse axis.

In a preferred embodiment, the vehicle is provided with a stabilising system comprising rotatable ground engaging member on the left hand side and the right hand side of the vehicle. In general these will be located between the centre of the front sphere and the centre of the rear sphere.

Whilst the ground engaging members of the stabilising system could be small wheels, casters or the like, preferably each member comprises a stabiliser housing in which a rotatable ground engaging stabilising sphere is mounted by means of bearings such that the stabilising sphere can rotate about three orthogonal axes.

The stabilising system is preferably removable from the vehicle, and preferably can be re-attached as needed.

In general, the vehicle will have two principal ground engaging members only—the front and rear spheres—and the optional stabilising ground engaging members. Those stabilising members will generally be of significantly smaller size than the principal ground engaging members and will have a substantially smaller diameter than either the front or rear sphere.

Preferably the front sphere and the rear sphere are hollow.

In a preferred arrangement, the one sphere, typically the front sphere, can be separated into two halves, and the other sphere can be positioned within it for storage or transportation. Preferably, that other sphere itself can be separated into two halves for storage and transportation, so that other components can be placed within the sphere and then the filled sphere placed inside the said one sphere. The other components could be any or all of the stabilising system; the seat; the hand engaging portion and so forth.

The arrangement may be such that one housing, such as the front housing, is larger than the other. In that case, the smaller housing may be fitted within the larger housing for storage and transportation. The sphere in the larger housing will be removed to facilitate this, and the larger housing may be split so that the smaller one can be placed within it.

The smaller housing could be such as to receive other components such as any or all of the stabilising system; the seat; the hand engaging portion and so forth. To this end the sphere may be removable from the smaller housing and/or the smaller housing may be split.

In preferred embodiments, the front housing and front sphere are larger than the rear housing and the rear sphere. Thus the rear sphere is of smaller diameter than the front sphere.

In one preferred embodiment of the invention, the front sphere is larger than the rear housing. In such an arrangement, preferably the front sphere can be separated into two halves, and the rear housing containing the rear sphere can be positioned within the front sphere for storage or transportation. Preferably, the rear sphere itself can be separated into two halves for storage and transportation, so that other components can be placed within the rear sphere and then the filled rear sphere placed inside the front sphere. The other components could be any or all of the stabilising system; the seat; the hand engaging portion and so forth. It will be appreciated that things could be the other way round, with the rear sphere being larger than the front housing.

The hand engaging portion may be in the form of a handle or handlebar arrangement, having for example an upright portion projecting from the front housing and a crossbar. Alternatively, there could be a pair of protuberances provided on the front housing.

Viewed from another aspect the invention provides a foot propelled vehicle comprising a first housing in which a first rotatable ground engaging sphere is mounted by bearings for rotation about a single transverse axis; a second housing in which a second rotatable ground engaging sphere is mounted by bearings for rotation about three orthogonal axes; the first housing being longitudinally spaced from and connected rigidly to the second housing; a seat portion for a user situated between the first and second housings and positioned so that the user's feet can contact the ground to propel the vehicle; and a fixed transverse handle mounted on one of the first and second housings for the user to hold whilst riding and steering the vehicle.

In some embodiments the first housing is a front housing, the second housing is a rear housing, and the handle is mounted above the front housing.

In such an arrangement, in some embodiments a connecting support is connected to the front housing, the connecting support extends from the front housing to the rear housing and is connected to the rear housing, the handle is mounted on the connecting support, and the seat portion is defined by a depressed portion of the connecting support between the front housing and the rear housing.

In some embodiments a first stabilising ground engaging member is mounted in a first support on one side of the vehicle for rotation about a plurality of axes, between the first and second housings; a second stabilising ground engaging member is mounted in a second support on the other side of the vehicle for rotation about a plurality of axes, the second support being positioned laterally of the first support, between the first and second housings; and the first and second stabilising ground engaging members are of substantially smaller size than the first ground engaging sphere and the second ground engaging sphere.

The first support and first stabilising ground engaging member may be removable from the vehicle, and the second support and second stabilising ground engaging member is removable from the vehicle.

It will be appreciated that whilst the invention is particularly applicable to a foot powered vehicle, it could be applied to a vehicle provided with means for rotating one or both of the spheres to drive the vehicle along, such as a pedal mechanism, an electric motor and so forth. Furthermore, whilst the invention is particularly suitable for young children, versions could be constructed for older children and for adults.

The vehicle may for example be constructed principally form plastics materials or any other suitable materials including wood, metals and composites.

These and other aspects and advantages will become apparent to those of ordinary skill in the art by reading the following detailed description of exemplary embodiments with reference to the accompanying drawings. Further it should be understood that the foregoing summary is merely fro the purposes of illustration and is not intended to limit the scope of the invention as claimed.

DETAILED DESCRIPTION OF THE PREFERRED EMBODIMENTS

Figure 1:
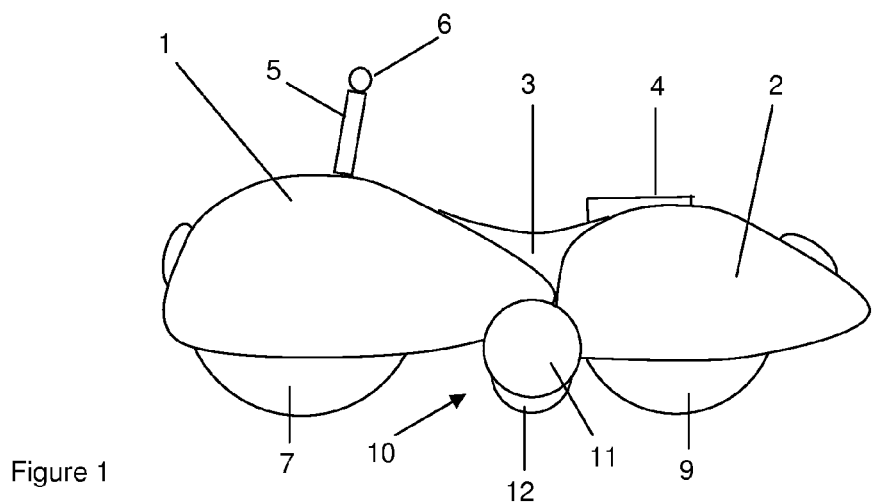
FIG. 1 is a side view of a an embodiment of the invention.
Figure 2:
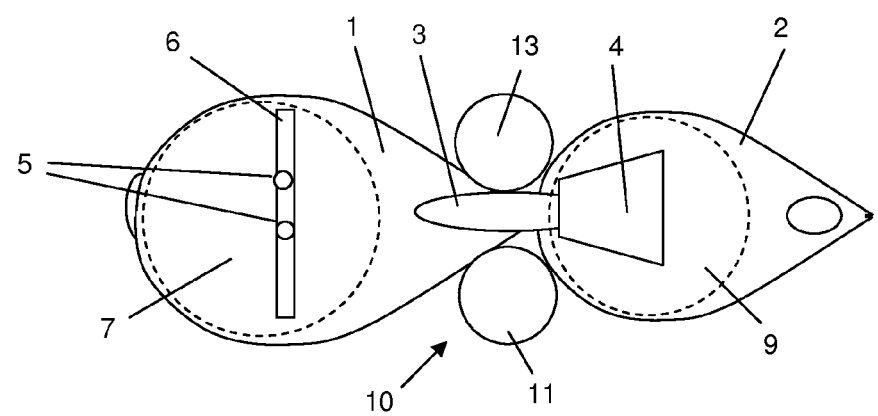
FIG. 2 is a top view of that vehicle.

Referring now to FIGS. 1 to 5 of the drawings in more detail, there is shown a first embodiment of a vehicle in accordance with the invention, which comprises a front main assembly including a front main housing 1 which is attached releasably to a rear main assembly which comprises a rear main housing 2. A junction portion 3 is provided, attached releasably to both housings. A seat or saddle 4 is provided on the rear housing 2. A handle comprising a pair of uprights 5 and a cross bar 6 is attached to the front housing 1. A front hollow sphere 7 is mounted in the front housing 1 by means of bearings 8 that permit rotation about three orthogonal axes. A rear hollow sphere 9 is mounted in the rear housing 2 in a similar manner, by means of bearings 8'. The rear sphere is of smaller external diameter than the external (and internal) diameter of the front sphere.

A left stabiliser 10 comprises a left stabiliser housing 11 in which is mounted a left stabilising sphere 12 by means of bearings 8" that permit rotation about three orthogonal axes. A right stabiliser 13 is of the same construction, with a right stabilising sphere mounted within a right stabiliser housing by means of bearings 8" that permit rotation about three orthogonal axes. The stabilisers 10 and 13 are attached releasably to the front housing 1 and the rear housing 2. The spheres of the stabilising system are of substantially smaller diameter than the front and rear spheres.

The vehicle can be used with the stabilisers 10 and 13 attached, or with them removed.

Figure 3:
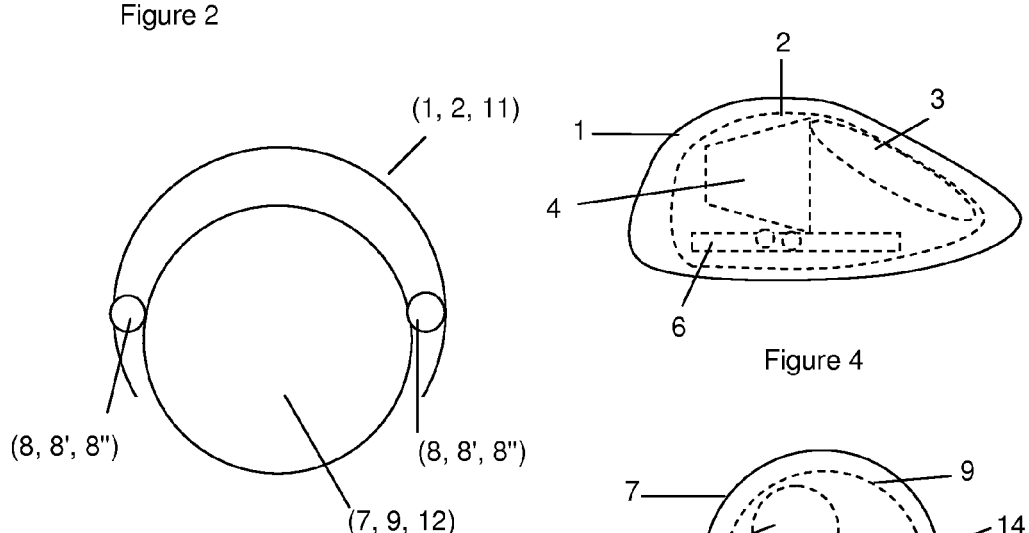
FIG. 3 is a diagram illustrating how spheres are mounted in that vehicle.

It will be appreciated that FIG. 3 is generic, to represent the front housing and sphere, the rear housing and sphere, and the stabiliser housings and spheres.

Figure 4:
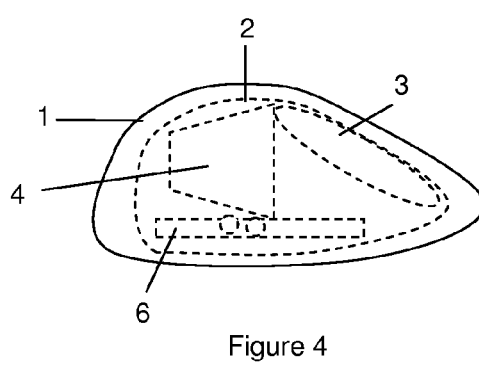
FIG. 4 shows housings nested together in that vehicle.
Figure 5:
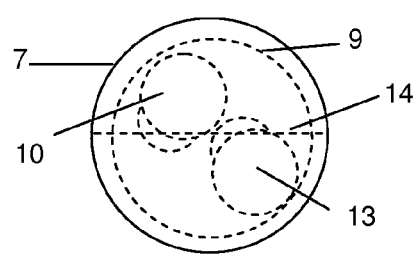
FIG. 5 shows spheres nested together in that vehicle.

For ease of storage and transportation each of the front housing, rear housing, front sphere and rear spheres can be separated into two halves. In a disassembled state, in this embodiment, which is by way of example only, the components can be arranged as follows. As shown in FIG. 4, the rear housing 2 is within the front housing 1, and itself contains the saddle, junction portion and handle. As shown in FIG. 5, the rear sphere 8 is within the front sphere 7 and contains the stabilisers 10 and 13. The split lines of the hollow spheres are indicated at 14.

Figure 6:
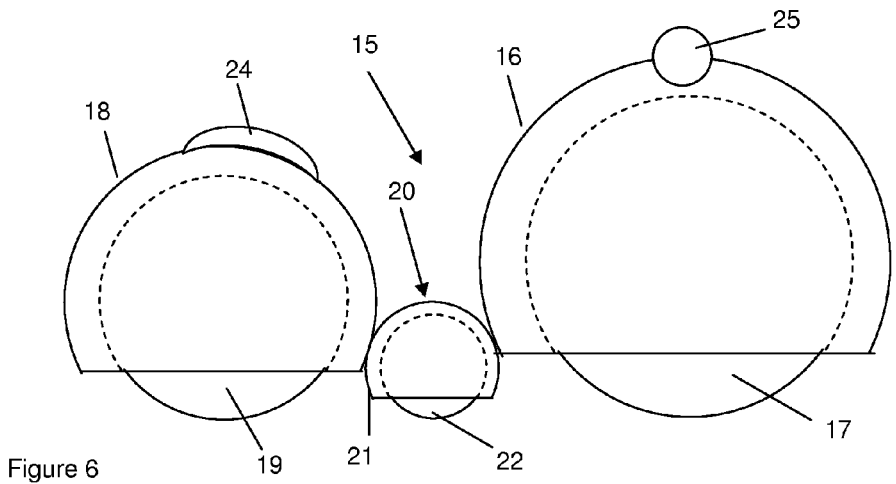
FIG. 6 is a side view of a second embodiment of a vehicle in accordance with the invention.
Figure 7:
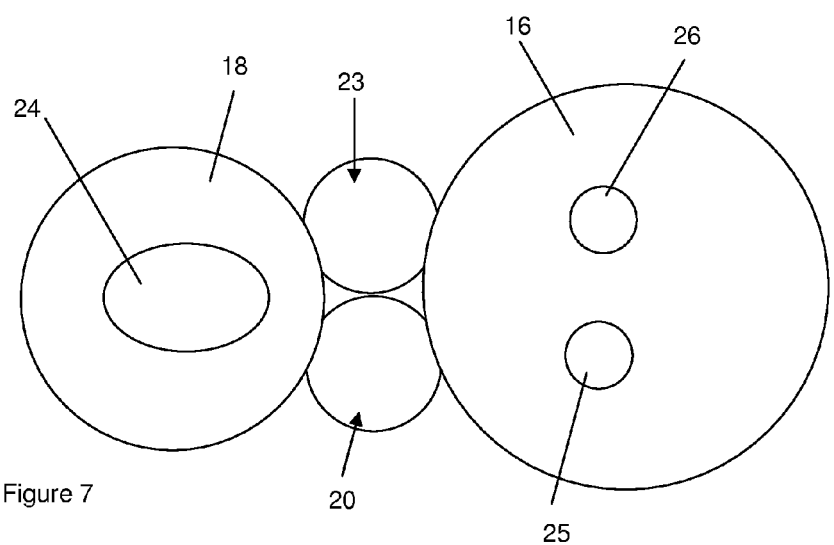
FIG. 7 is a top view of the vehicle of that second embodiment.
Figure 8:
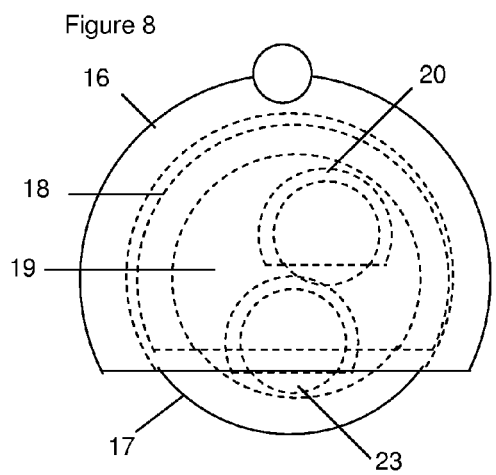
FIG. 8 is a diagram showing the second embodiment in a condition suitable for storage and transportation.

A second embodiment of a vehicle 15 in accordance with the invention is shown in FIGS. 6, 7 and 8. The vehicle comprises a part-spherical front housing 16 and a part-spherical rear housing 18. A front hollow sphere 17 is mounted in the front housing 1 by means of bearings in the manner illustrated in FIG. 3 that permit rotation about three orthogonal axes. A rear hollow sphere 19 is mounted in the rear housing 18 in a similar manner. The rear housing 18 and rear sphere 19 are of smaller external diameter than the external (and internal) diameter of the front sphere 17.

A right stabiliser 20 comprises a left housing 21 in which is mounted a left stabilising sphere 22 by means of bearings that permit rotation about three orthogonal axes. A left stabiliser 23 is of similar construction. The stabilisers 20 and 23 are attached releasably to the front housing 16 and the rear housing 18, and in this embodiment serve to join the housings together although there could be additional components such as junction portion similar to portion 3 of the first embodiment. The spheres of the stabilising system are of substantially smaller diameter than the front and rear spheres.

The vehicle can be used with the stabilisers 20 and 23 attached, or with them removed. In both embodiments the stabilising spheres could be solid or hollow.

A seat 24 is provided on the rear housing 18. A pair of protuberances 25 and 26 are provided on the front housing 16, which a rider can grip with their hands. Alternatively a handle such as that in the previous embodiment could be provided.

For ease of storage and transportation, the front and rear housings can be separated from the stabilising systems and each of the front housing, rear housing, front sphere and rear spheres can be separated into two halves. The vehicle can be disassembled as follows.

By separating the front housing 16 into two parts, the front sphere 17 can be accessed and separated into two parts. Similarly, by separating the rear housing 18 into two parts, the rear sphere 19 can be accessed and separated into two parts. The stabilising systems 20 and 23 can be placed inside the rear sphere 19, which is reassembled and placed inside the rear housing 18, which is itself reassembled. Any other components such as a handle, or a junction portion, may also be placed within the rear sphere 19. The rear housing 18, with its contents, is then placed within the front sphere 17. This is reassembled and placed inside the front housing 16, which is itself reassembled.

This vehicle is of simpler appearance than the first vehicle, but it could be enhanced, for example by means of a fabric covering depicting an animal such as a caterpillar, a mythical creature such as a dragon, and so on. Such a fabric covering could also be stored within the rear sphere. Such an arrangement could also be used with the first embodiment.

Figure 9:
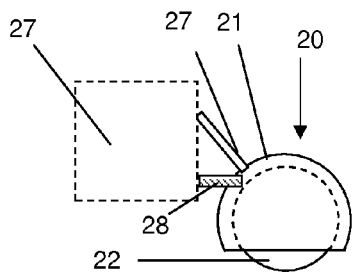
FIG. 9 is a diagram showing an alternative way of mounting a stabiliser system on the vehicle.

FIG. 9 shows an alternative way of attaching a stabilising system to the vehicle. In this case, the left hand stabiliser 20, comprising housing 21 and sphere 22 is attached to a part of the vehicle indicated schematically at 27 by means of a link 27 between the housing 21 and the vehicle part 27, which is pivoted at one end to allow for pivotal movement of the stabiliser 20. The stabiliser 20 can thus move upwardly and away with respect to the vehicle part, this movement being moderated by a resilient member 28 such as a spring acting between the vehicle part and the housing 21. A corresponding arrangement is used for the right stabiliser 23. In this manner, even with the stabilising system deployed a rider can "bank" the vehicle when turning.

Figure 10:
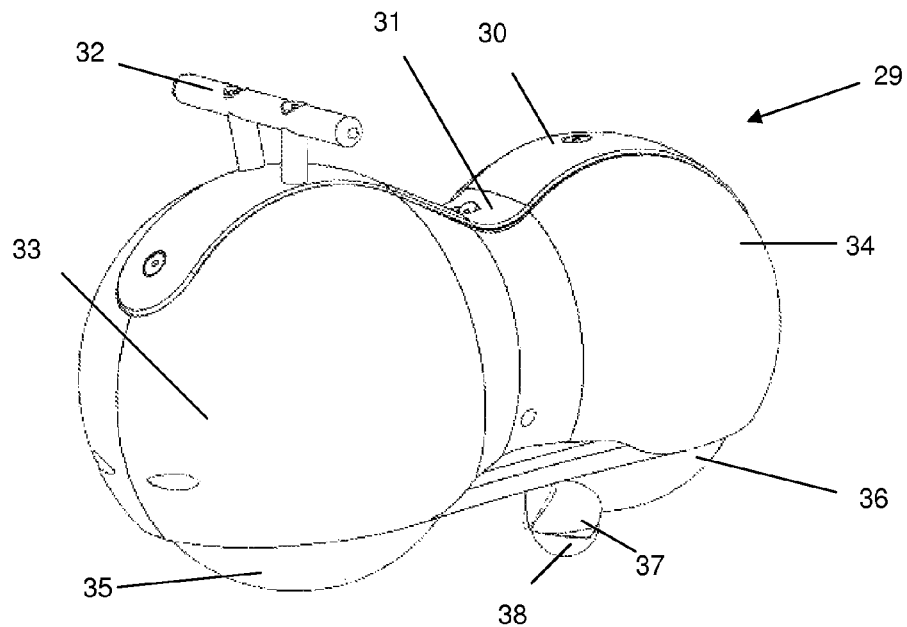
FIG. 10 is a front perspective view of another embodiment of a vehicle in accordance with the invention.
Figure 11:
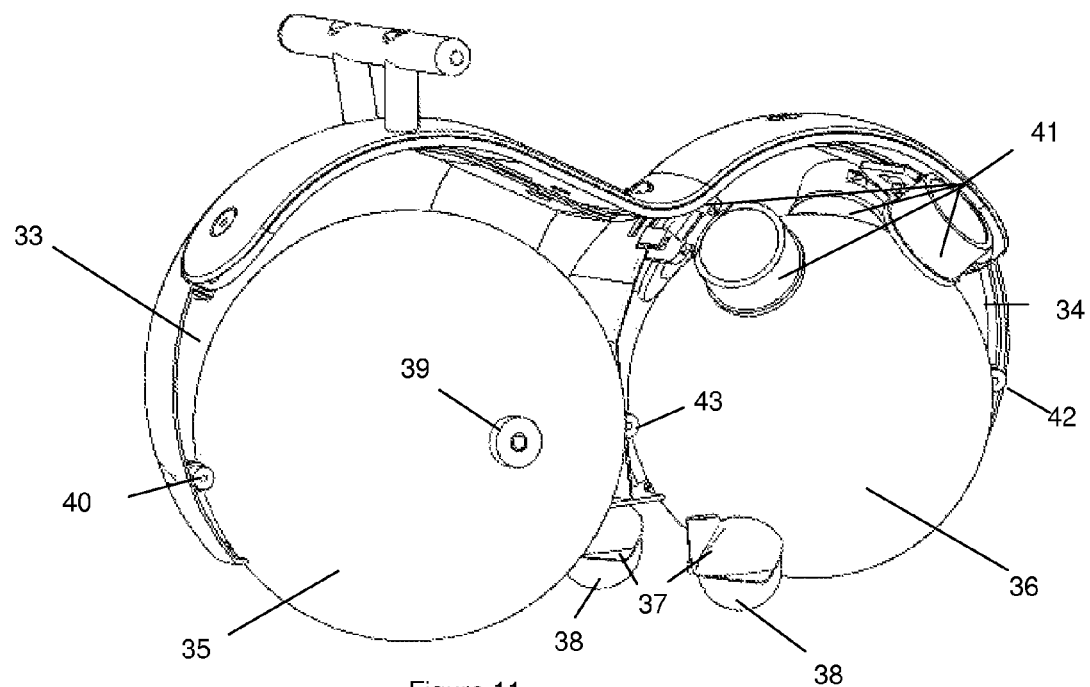
FIG. 11 is a partly cut away view of FIG. 10.

FIGS. 10 and 11 show a vehicle 29 in accordance with the present invention, which is a modification of the vehicles described above. Where not described specifically, components of this vehicle are analogous to components of the vehicles described above. The vehicle comprises a longitudinal support 30 which is curved to provide a seat portion 31. A front portion of the support 30 is attached to a fixed, transverse handle 32. The support 30 is connected to a part-spherical front housing 33 and to a part-spherical rear housing 34. In the front housing a sphere 35 is mounted for rotation and in the rear housing a sphere 36 is mounted for rotation. A removable pair of stabilisers 37 containing spheres 38 are provided. The stabilising spheres may each be mounted for rotation about three orthogonal axes or for rotation about a single transverse axis. The stabilisers may be in the form of casters, rotatable about vertical axes. The seat portion 31 is provided between the front housing 33 and the rear housing 34, in a lowered part of the support 30. The seat portion is at a height where a rider, typically a young child can touch the ground with both feet and can propel the vehicle using the feet.

With reference to FIG. 11, the front sphere 35 is supported in housing 33 by bearings 39 at either side (one side only shown) for rotation about a fixed transverse axis only. Front and rear support rollers 40 and 43 are also provided for the sphere. The rear sphere 36 is supported in housing 34 by means of four top bearings 41 and by front and rear support rollers 42 and 43 for rotation about three orthogonal axes. The provision of only one sphere which is rotatable about three orthogonal axes, with the other sphere rotatable about a fixed transverse axis, improves stability and ease of use by young riders. The front and rear housings 33 and 34 are connected together rigidly so as to prevent relative pivotal motion about a vertical axis. Thus, there is no pivoting of either housing to provide steering. The vehicle is steered by using the feet which propel the vehicle and/or by shifting weight. The fact that the rear sphere 36 can rotate about three orthogonal axes is sufficient to enable a rider to steer the vehicle by using the feet and/or by shifting weight so that the vehicle points in the correct direction.

Features of some embodiments of the invention are also set out in the following clauses.

Clause 1. A vehicle comprising: a front housing in which a front rotatable ground engaging sphere is mounted by means of bearings such that the front sphere can rotate about a plurality of axes; a rear housing in which a rear rotatable ground engaging sphere is mounted by mans of bearings such that the sphere can rotate about a plurality of axes; a seat portion for a user; and a handle mounted on the front housing for the user to hold whilst riding the vehicle.

Clause 2. A vehicle as defined in clause 1, wherein front sphere can rotate about three orthogonal axes, and the rear sphere can rotate about three orthogonal axes.

Clause 3. A vehicle as defined in clause 1 or 2, being adapted for propulsion by the foot or feet of a user, so that a user can sit on the seat portion with the users foot or feet engaging the ground to propel the vehicle.

Clause 4. A vehicle as defined in clause 1, 2 or 3, wherein the seat portion is provided on the rear housing.

Clause 5. A vehicle as defined in any preceding clause, wherein a stabilising system comprises rotatable ground engaging members on the left hand side and the right hand side of the vehicle.

Clause 6. A vehicle as defined in clause 5, wherein the ground engaging members of the stabilising system are located between the centre of the front sphere and the centre of the rear sphere.

Clause 7. A vehicle as defined in clause 4 or 5, wherein the ground engaging members of the stabilising system are stabilising spheres mounted by means of bearings in respective stabiliser housings such that the stabilising spheres can rotate about a number of axes.

Clause 8. A vehicle as defined in clause 7, wherein the stabilising spheres can rotate about three orthogonal axes.

Clause 9. A vehicle as defined in clause 7 or 8, wherein the stabilising spheres are of substantially smaller diameter than the front or rear spheres.

Clause 10. A vehicle as defined in any of clauses 5 to 9, wherein the stabilising system is removable from the vehicle, and can be re-attached to the vehicle.

Clause 11. A vehicle as defined in any of clauses 5 to 10, wherein the stabilising system is mounted to the vehicle in such a manner that the left hand ground engaging member and the right hand ground engaging member can pivot towards and away from a part of the vehicle to which they are attached.

Clause 12. A vehicle as defined in any preceding clause, wherein the front sphere and the rear sphere are of different external diameters.

Clause 13. A vehicle as defined in clause 12, wherein the front sphere and the rear sphere are hollow and the arrangement is such that one can be fitted within the other for storage and transportation.

Clause 14. A vehicle as defined in clause 13, wherein the arrangement is such that other components of the vehicle can be fitted within the one sphere that is fitted within the other for storage and transportation.

Clause 15. A vehicle as defined in clause 13 or 14, wherein the housing of the sphere of larger diameter is of a larger size than the housing of the other sphere and the arrangement is such that the smaller housing can be fitted within the larger housing for storage and transportation.

Clause 16. A vehicle as defined in clause 15, wherein the arrangement is such that other components of the vehicle can be fitted within the smaller housing for storage and transportation.

Clause 17. A vehicle as defined in clause 12, wherein the housing of the smaller of the front and rear spheres, is of smaller size than the other sphere, and the arrangement is such that the housing containing the smaller sphere can be fitted within the other sphere for storage and transportation.

Clause 18. A vehicle as defined in clause 10, wherein the front sphere and the rear sphere are of different external diameters, the housing of the smaller of the front and rear spheres is of smaller size than the other sphere, the arrangement is such that the housing containing the smaller sphere can be fitted within the other sphere for storage and transportation, and the arrangement is such that the stabilising system can be fitted within the rear sphere.

Clause 19. A vehicle as defined in any of clauses 12 to 18, wherein the front sphere is of larger diameter than the rear sphere.

It will be appreciated that in the embodiments described in the above clauses, instead of mounting the spheres for rotation about three axes, one or both could be mounted in an alternative manner providing more limited freedom of movement, such as rotation about a single transverse axis.

Variations from the disclosed embodiments may be made without departing from the spirit and scope of the invention.

What is claimed is:

1. A vehicle comprising:
   a front housing in which a front rotatable ground engaging sphere is mounted by bearings;
   a rear housing in which a rear rotatable ground engaging sphere is mounted by bearings;
   a seat portion for a user; and
   a handle mounted above the front housing for the user to hold whilst riding the vehicle,
   wherein at least one of said front and rear spheres is mounted by bearings for rotation about a plurality of axes;
   and wherein the vehicle is provided with a stabilising system comprising a rotatable ground engaging stabiliser member on each side of the vehicle to stabilise the vehicle.

2. A vehicle as claimed in claim 1, wherein said at least one of the front and rear spheres is mounted for rotation about three orthogonal axes.

3. A vehicle as claimed in claim 2, wherein both of said front and rear spheres are mounted for rotation about three orthogonal axes.

4. A vehicle as claimed in claim 2 wherein one of said front and rear spheres is mounted for rotation about three orthogonal axes and the other of said front and rear spheres is mounted for rotation about two axes.

5. A vehicle as claimed in claim 2 wherein one of said front and rear spheres is mounted for rotation about three orthogonal axes and the other of said front and rear spheres is mounted for rotation about a single transverse axis.

6. A vehicle as claimed in claim 5, wherein the rear sphere is mounted for rotation about three orthogonal axes and the front sphere is mounted for rotation about a single transverse axis.

7. A vehicle as claimed in claim 1, wherein the vehicle is foot propelled, and the seat portion is positioned such that a rider's feet may engage the ground to propel the vehicle.

8. A vehicle as claimed in claim 1 wherein the seat portion is provided on the rear housing.

9. A vehicle as claimed in claim 7, wherein the seat portion is provided between the front and rear housings.

10. A vehicle as claimed in claim 8, wherein the seat portion is lowered with respect to the front and rear housings.

11. A vehicle as claimed in claim 1, wherein the ground engaging stabilising members are stabilising spheres mounted by means of bearings in respective stabiliser housings such that the stabilising spheres can rotate about a number of axes.

12. A vehicle as claimed in claim 11, wherein the stabilising spheres can rotate about three orthogonal axes.

13. A vehicle as claimed in claim 12, wherein the stabilising spheres are of substantially smaller diameter than the front or rear spheres.

14. A vehicle as claimed in claim 1, wherein the stabilising system is removable from the vehicle and re-attachable to the vehicle.

15. A vehicle as claimed in claim 11, wherein the stabilizing spheres are mounted to pivot towards and away from the vehicle.

16. A vehicle as claimed in claim 1, wherein the ground engaging stabilizing members are stabilizing spheres and each stabilizing sphere is mounted for rotation about a single transverse axis.

17. A vehicle as claimed in claim 1, wherein the stabilising members are positioned between the front and rear housings.

18. A foot propelled vehicle comprising a first housing in which a first rotatable ground engaging sphere is mounted by bearings for rotation about a single transverse axis; a second housing in which a second rotatable ground engaging sphere is mounted by bearings for rotation about three orthogonal axes; the first housing being longitudinally spaced from and connected rigidly to the second housing; a seat portion for a user situated between the first and second housings and positioned so that the user's feet can contact the ground to propel the vehicle; and a fixed transverse handle mounted on one of the first and second housings for the user to hold whilst riding and steering the vehicle; wherein
    a first stabilising ground engaging member is mounted in a first support on one side of the vehicle for rotation about a plurality of axes, between the first and second housings; a second stabilising ground engaging member is mounted in a second support on the other side of the vehicle for rotation about a plurality of axes, the second support being positioned laterally of the first support, between the first and second housings; and the first and second stabilising ground engaging members are of substantially smaller size than the first ground engaging sphere and the second ground engaging sphere.

19. A vehicle as claimed in claim 18, wherein the first housing is a front housing, the second housing is a rear housing, and the handle is mounted above the front housing.

20. A vehicle as claimed in claim 19, wherein a longitudinal support is connected to the front housing, the longitudinal support extends from the front housing to the rear housing and is connected to the rear housing, the handle is mounted on the longitudinal support, and the seat portion is defined by a depressed portion of the longitudinal support between the front housing and the rear housing.

21. A vehicle as claimed in claim 18 wherein the first support and first stabilising ground engaging member are removable from the vehicle, and the second support and second stabilising ground engaging member are removable from the vehicle.

22. An unpowered, foot propelled vehicle on which a user sits and propels the vehicle by means of the user's feet contacting the ground, the vehicle being supported on the ground by a single front, ground engaging, rotatable front sphere and a single rear, ground engaging, rotatable rear sphere, use of the vehicle requiring balance from the user; wherein
    the vehicle comprises a front housing in which the front sphere is mounted by bearings for rotation about a single transverse axis; and a rear housing in which the rear sphere is mounted by bearings for rotation about three orthogonal axes;
    the front housing is longitudinally spaced from and connected rigidly to the rear housing by a longitudinal support which is connected to the front housing, extends from the front housing to the rear housing and is connected to the rear housing;
    a seat portion for the user is defined between the front and rear housings, the seat portion being defined by a depressed portion of the longitudinal support between the front housing and the rear housing; and
    a fixed transverse handle is mounted on the front housing for the user to hold whilst riding and steering the vehicle, steering being effected without pivoting of the front housing or the rear housing.

23. A vehicle as claimed in claim 22, wherein
    a first ground engaging stabilising sphere is mounted in a first support on one side of the vehicle for rotation about a plurality of axes, between the front and rear housings; a second ground engaging stabilising sphere is mounted in a second support on the other side of the vehicle for rotation about a plurality of axes, the second support being positioned laterally of the first support, between the front and rear housings; and the first and second stabilising spheres are of substantially smaller size than the first and second support spheres.

24. A vehicle as claimed in claim 23, wherein the first stabilising sphere and first support are removable from the vehicle and the second stabilising sphere and second support are removable from the vehicle.

\* \* \* \* \*